US006714260B1

(12) United States Patent
Pine

(10) Patent No.: US 6,714,260 B1
(45) Date of Patent: Mar. 30, 2004

(54) MONOLITHIC GENERATION OF RF FOR WIRELESS TRANSMISSION OF VIDEO

(75) Inventor: Joshua I. Pine, Seal Beach, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/121,476

(22) Filed: Jul. 23, 1998

(51) Int. Cl.[7] .................................................. H04N 5/40

(52) U.S. Cl. ....................... 348/724; 348/723; 348/642; 348/493

(58) Field of Search ................................ 348/724, 723, 348/726, 642, 638, 493, 720, 17, 21, 22, 222, 239; 332/149, 103, 105; 455/326, 333; H04N 5/40, 5/38

(56) References Cited

U.S. PATENT DOCUMENTS 3,697,684 A * 10/1972 Lesartre ...................... 178/7.2
4,338,580 A * 7/1982 Gay ......................... 332/31 T
5,087,975 A * 2/1992 Citta et al. .................. 358/183
5,121,203 A * 6/1992 Citta .......................... 358/141
5,708,399 A * 1/1998 Fujii et al. .................. 332/103
5,822,020 A * 10/1998 Bargauan .................... 348/724
5,841,481 A * 11/1998 Yoshikawa .................. 348/726
5,875,005 A * 2/1999 Bargauan .................... 348/724
5,877,821 A * 3/1999 Newlin et al. ............. 348/724
5,896,182 A * 4/1999 Klaeyle ...................... 348/724
5,923,761 A * 7/1999 Lodenius ..................... 380/49
5,946,047 A * 8/1999 Levan ........................ 348/724
6,008,703 A * 12/1999 Perrott et al. ............... 332/100
6,016,169 A * 1/2000 Mok .......................... 348/724
6,061,101 A * 5/2000 Takei ......................... 348/642
6,134,223 A * 10/2000 Burke et al. ................ 348/724
6,141,037 A * 10/2000 Upton et al. .................. 348/65
6,276,605 B1 * 8/2001 Olmstead et al. ...... 235/462.41
6,278,481 B1 * 8/2001 Schmidt ...................... 348/64
6,288,742 B1 * 9/2001 Ansari et al. .......... 348/211.14

FOREIGN PATENT DOCUMENTS

WO WO 93/17522 * 9/1993 ............ H04N/5/40

OTHER PUBLICATIONS

The Illustrated Dictionary of Electronics, Seventh Edition, Stan Gibilisco Editor–in–Chief, pp. 133, 711.*
The Illustrated Dictionary of Electronics, Seventh Edition, Stan Gibilisco Editor–in–Chief, 1997, p. 133.*

* cited by examiner

*Primary Examiner*—Michael H. Lee
*Assistant Examiner*—Jean W. Désir
(74) *Attorney, Agent, or Firm*—Thomas, Kayden, Horstemeyer & Risley, LLP

(57) ABSTRACT

A digital imaging system generates a composite video signal and the carrier frequency of a desired television channel is generated internal to the imager integrated circuit. The carrier frequency is then amplitude modulated with the composite video signal by either digital or analog means located on-chip. Thus, a radio frequency signal that can be picked up by conventional television receivers is directly synthesized on-chip to provide a wireless video link.

12 Claims, 2 Drawing Sheets

MONOLITHIC GENERATION OF RF FOR WIRELESS TRANSMISSION OF VIDEO

BACKGROUND OF THE INVENTION

1. Field of the Invention

The subject invention relates generally to signal transmission and more particularly to a method and apparatus for in-chip synthesis of a radio frequency (RF) video signal for transmission to remote sources.

2. Description of Related Art

It has appeared desirable to the inventor to provide a wireless video link to permit the signal generated by video imaging circuitry to be picked up by television receivers at remote locations. This can be useful when the convenience of wireless connection is desired, or the video imaging circuitry (camera) itself is at a remote location such as at the top of a power pole or deep inside a piece of machinery.

SUMMARY OF THE INVENTION

According to the invention, a digital imaging system generates a composite video signal and the carrier frequency of the desired television channel is generated internal to the imager integrated circuit (ASIC). The carrier frequency is then amplitude modulated with the composite video signal by either digital or analog means located on-chip. Thus, a radio frequency signal that can be picked up by conventional television receivers is directly synthesized on-chip to provide a wireless video link. If desired, the carrier frequency may also be employed to clock the digital imaging system.

The invention thus provides a monolithic solution admirably suited for VLSI implementation, which eliminates what would normally be a cumbersome multipackage design. The invention can provide even further system simplification in certain embodiments only one oscillator need be used.

BRIEF DESCRIPTION OF THE DRAWINGS

The features of the present invention, which are believed to be novel, are set forth with particularity in the appended claims. The present invention, both as to its organization and manner of operation, together with further objects and advantages, may best be understood by reference to the following description of a preferred embodiment thereof taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art.

Figure 1:
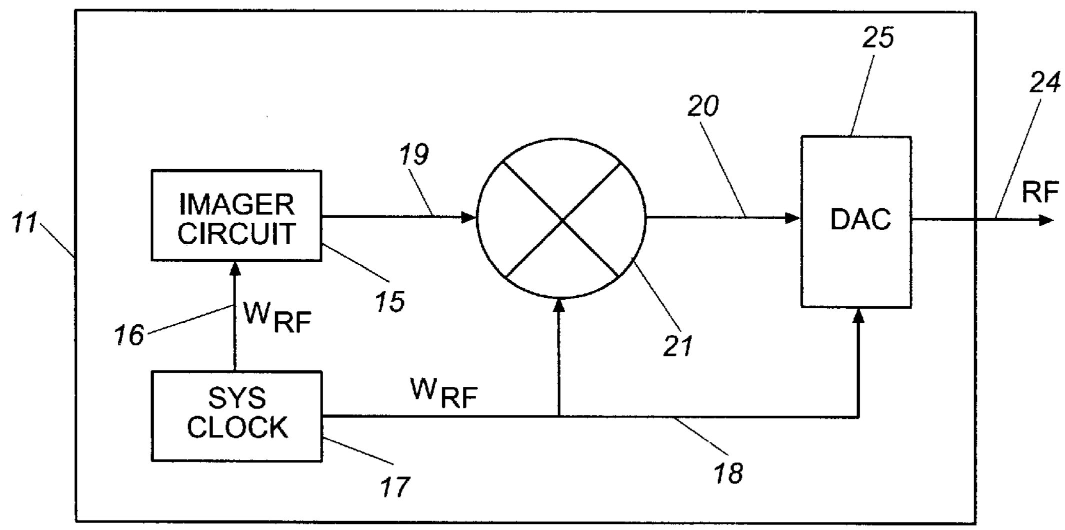
FIG. 1 is a circuit block diagram illustrating a first embodiment according to the invention.

An illustrative embodiment of the invention is shown in FIG. 1. According to the circuit of FIG. 1, an imager circuit 15 outputs a composite video signal on a line 19 to a digital multiplier 21. A system clock 17 supplies a master clock frequency $\omega_{RF}$ on a line 16 to the imager circuit and on a line 18 to the multiplier 21 and to a digital-to-analog converter (DAC) circuit 25. The system master clock frequency $\omega_{RF}$ is set at the desired carrier frequency for a radio transmission of the composite video signal. Thus, the frequency $\omega_{RF}$ on line 18 is amplitude modulated by the composite video signal on signal line 19, and the amplitude modulated signal is supplied over line 20 to the digital analog converter 25. The digital analog converter 25 outputs an analog RF signal on line 24 comprising the composite video signal at the carrier frequency.

According to the embodiment of FIG. 1, all of the circuitry 15, 17, 21, 25 is located within the boundary 11 of a single integrated circuit. The integrated circuit is preferably fabricated according to VLSI techniques, for example, implemented in CMOS. The imager circuit 15 would typically include an array of photo detectors and suitable buffering and multiplexing circuitry, as known in the art. Thus, according to the embodiment of FIG. 1, a system clock at the carrier frequency is amplitude modulated by digital means using a digital multiplier feeding a high speed DAC.

Figure 2:
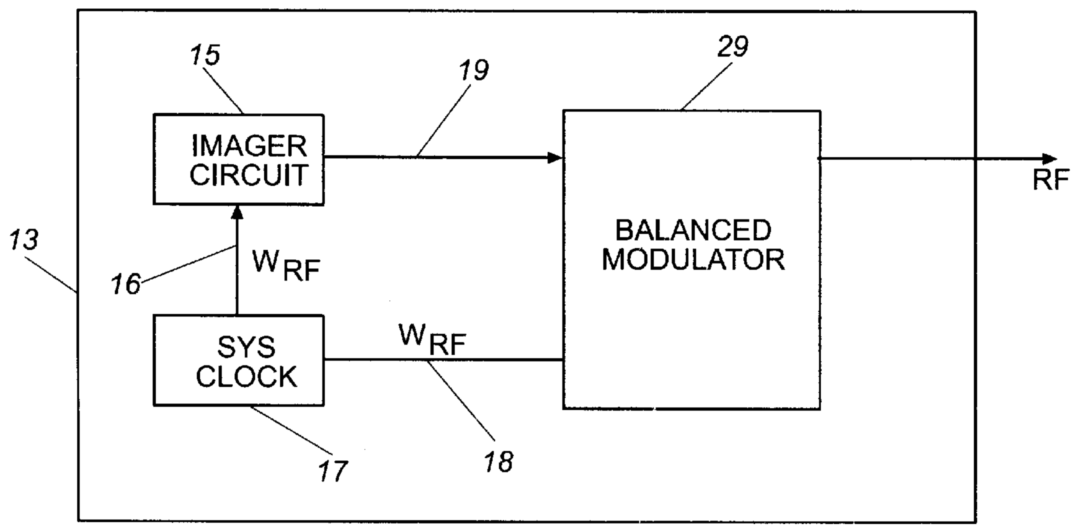
FIG. 2 is a circuit block diagram illustrating a second embodiment according to the invention.

According to the embodiment of FIG. 2, the composite video signal on the signal line 19 is applied to one input of a balanced modulator 29, while the radio frequency clock signal on line 18 is applied to a second input of the modulator 29. In this manner, the carrier frequency $\omega_{RF}$ is amplitude modulated by analog means, using balanced modulator 29. Again, all of the circuitry 15, 17, 19 is located within the boundary 13 of a single integrated circuit. Again, the integrated circuit may be fabricated using VLSI CMOS technology.

Figure 3:
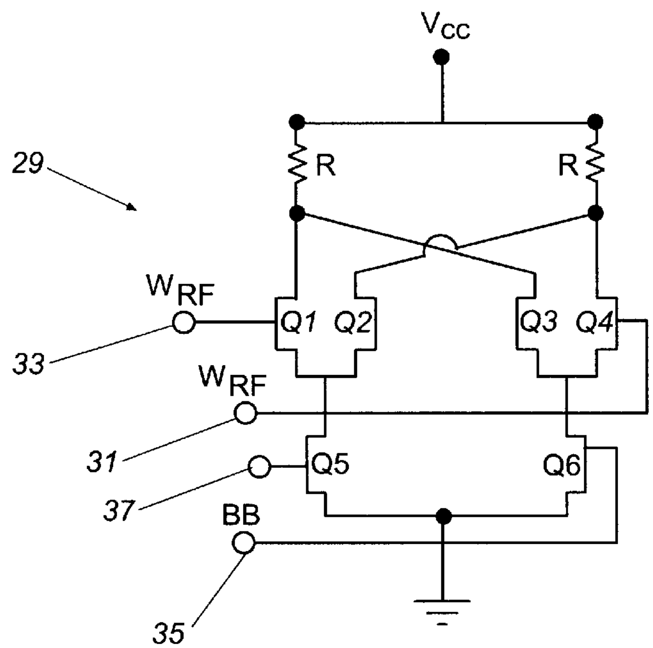
FIG. 3 illustrates a first balanced modulator usable in the embodiment of FIG. 2.

FIG. 3 illustrates one embodiment of a balanced modulator 29 particularly adapted to be implemented in VLSI CMOS. The balanced modulator circuit per se is known in the art and is referred to as a Gilbert Cell. As is shown in FIG. 3, the base band signal BB is applied to respective nodes 35, 37, which constitute the respective gates of transistors Q5 and Q6. Respective lower legs (sources) of the transistors Q5, Q6 are joined together and connected to ground, while their respective opposite upper legs (drains) are connected to respective junction points of the lower legs of respective pairs of transistors Q1, Q2; Q3, Q4. The gate of the transistor Q1 receives the carrier frequency $\omega_{RF}$ while the gate of the transistor of Q4 receives the carrier frequency 180° out of phase, i.e., $\overline{\omega}_{RF}$. The upper legs of the transistors Q2 and Q3 are cross-connected to the upper legs of the transistors Q4 and Q1. The gates of the transistors Q2 and Q3 are connected together. The circuit of FIG. 3 is differential in nature, and provides a differential output to the antenna indicated as R, R respectively, where R is the antenna impedance at the carrier frequency which may be, for example, 200 ohms. The antenna per se is located external to the chip.

Figure 4:
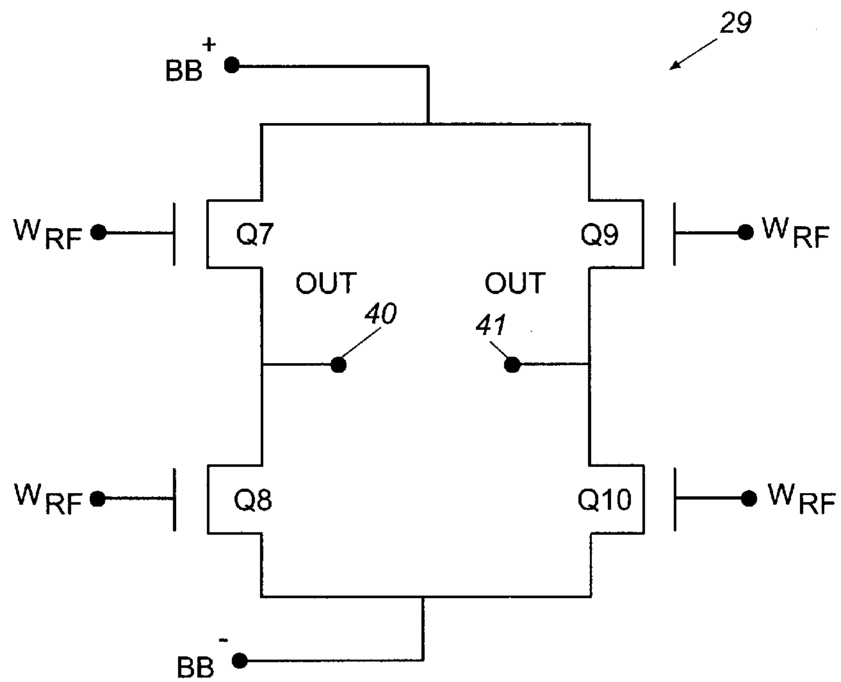
FIG. 4 illustrates a second balanced modulator usable in the embodiment of FIG. 2.

FIG. 4 illustrates a second embodiment of the balanced modulator 29, which is again per se a conventional alternative embodiment balanced modulator for CMOS VLSI implementation. In this embodiment, transistors Q7 and Q8 are serially connected, as are transistors Q9 and Q 10. The lower legs of the transistors Q8 and Q 10 are connected together and receive one side of the baseband input BB, i.e., the composite video signal. The upper legs of the transistors Q7 and Q9 are connected together and receive the opposite side of the baseband composite video signal input BB. The gates of the transistors Q7 and Q10 receive the carrier frequency input $\omega_{RF}$ while the gates of the transistors Q8 and Q9 receive the carrier frequency shifted in phase by 180, i.e., $\overline{\omega}_{RF}$. The output to the antenna appears at terminals 40, 41. Terminal 40 is the junction of the upper leg of the transistor Q8 with the lower leg of the transistor Q7, while terminal 41 is the juncture of the upper leg of the transistor Q10 with the lower leg of the transistor Q9.

FIGS. 1 and 2 show the same system clock 17 supplying the frequency $\omega_{RF}$ to the imager circuit 15. In other embodiments a separate clock circuit could be used to clock the imager circuit 15. The clock $\omega_{RF}$ can also be subdivided for that purpose. Those skilled in the art will appreciate that clock circuit 17 comprises only that clock circuitry suitable for CMOS VSLI fabrication with a suitable crystal and tank circuit typically located off-chip.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An integrated circuit formed in a CMOS structure, comprising:

an imager circuit formed in the CMOS structure for developing a composite video signal;

clock circuitry formed in the CMOS structure for providing a clock signal set at a radio frequency; and a modulator formed in the CMOS structure for modulating the clock radio frequency signal with the composite video signal to generate a radio frequency signal for wireless transmission, where said modulator comprises a digital multiplier circuit, receiving as the composite video signal as a first input, and the radio frequency clock signal as a second input.

2. The integrated circuit of claim 1, further comprising a digital to analog converter circuit formed in the CMOS structure supplied with an output from the digital multiplier circuit.

3. The integrated circuit of claim 1 wherein the radio frequency clock signal is also supplied as a clock signal to the imager circuit.

4. A method implemented in a CMOS structure for modulating a radio frequency signal with a composite video signal, the steps of the method comprising:

generating a composite video signal on a CMOS chip;

generating a carrier frequency signal on the CMOS chip; and modulating the carrier frequency signal with the composite video signal to thereby generate a radio frequency signal for wireless transmission, wherein the modulating step includes a digital multiplier circuit receiving the composite video signal as a first input and the carrier frequency signal as a second input.

5. The method of claim 4 further including the step of using the carrier frequency signal to generate a clock signal for use in generating the composite video signal.

6. The method of claim 4, wherein the modulating step includes a digital to analog converter circuit receiving an output from the digital multiplier circuit.

7. A single chip integrated circuit, comprising:

clock circuitry providing a radio frequency clock signal on the single chip integrated circuit;

an imager circuit for developing a composite video signal on the single chip integrated circuit, the imager circuit using the radio frequency clock signal in generating the composite video signal;

a first transistor having the radio frequency clock signal supplied to a first control terminal thereof on the single chip integrated circuit; and a second transistor having a signal supplied to a control terminal thereof which comprises the radio frequency clock signal shifted in phase by 180°, for modulating the composite video signal with the radio frequency clock signal to generate a radio frequency signal on the single chip integrated circuit for wireless transmission.

8. A single chip integrated circuit, comprising:

clock circuitry providing a radio frequency clock signal on the single chip integrated circuit;

an imager circuit for developing a composite video signal on the single chip integrated circuit, the imager circuit using the radio frequency clock signal to develop the composite video signal; and first and second transistors having the radio frequency clock signal supplied to respective control terminals thereof, and third and fourth transistors having the radio frequency clock signal shifted in phase by 180° supplied to respective control terminals thereof, for modulating the radio frequency clock signal with the composite video signal to generate a radio frequency signal on the single chip integrated circuit for wireless transmission.

9. A video communication system, comprising:

an imager circuit formed on an integrated circuit operable to generate a composite video signal;

clock circuitry formed on the integrated circuit operable to provide a radio frequency clock signal;

a modulator formed on the integrated circuit operable to modulate the radio frequency clock signal with the composite video signal to generate a radio frequency video signal for wireless transmission; and a television receiver operable to receive the radio frequency video signal via an antenna and display the radio frequency video signal on a screen.

10. The video system of claim 9, wherein the radio frequency clock signal is also supplied as a clock signal to the imager circuit.

11. The video system of claim 10, wherein the modulator is a digital multiplier circuit operable to multiply the composite video signal with the radio frequency clock signal to generate the radio frequency video signal for wireless transmission.

12. The video system of claim 11, further comprising a digital to analog converter operable to receive the radio frequency video signal and convert the radio frequency video signal to an analog radio frequency video signal.

* * * * *